United States Patent [19]

Halder

[11] Patent Number: 4,878,767
[45] Date of Patent: Nov. 7, 1989

[54] SLEEVE BEARING

[75] Inventor: Hans-Joerg Halder, Mannheim, Fed. Rep. of Germany

[73] Assignee: Firma Carl Freudenberg, Weinheim, Fed. Rep. of Germany

[21] Appl. No.: 300,432

[22] Filed: Jan. 23, 1989

[30] Foreign Application Priority Data

Feb. 17, 1988 [DE] Fed. Rep. of Germany ...... 3804886

[51] Int. Cl.⁴ .............................................. F16C 33/74
[52] U.S. Cl. .................................... 384/140; 384/221; 384/275; 277/95
[58] Field of Search ............... 384/140, 482, 275, 221, 384/220, 222; 277/95

[56] References Cited

U.S. PATENT DOCUMENTS 2,452,352 10/1948 Booth .................................. 384/140
2,903,306 9/1959 Barber ................................. 384/140
4,515,574 5/1985 Mazziotti ........................... 384/482
4,808,012 2/1989 Otto .................................... 384/482

*Primary Examiner*—Lenard A. Footland
*Attorney, Agent, or Firm*—Karl F. Milde Jr.

[57] ABSTRACT

A sleeve bearing comprises two sleeves which are mounted for relative rotation one inside the other and which contact one another at radially outwardly extending flanges. The outer sleeve consists of rubber and has a sealing lip on its flange. The sealing lip reaches around the profile of the projecting flange of the inner sleeve and its sealing edge is resiliently biased against the outer end face of the inner sleeve flange. In addition to the sealing edge, the sealing lip can also have a sealing surface which, in cooperation with secondary machine parts, constitutes an additional seal for protecting the sealing edge.

6 Claims, 1 Drawing Sheet

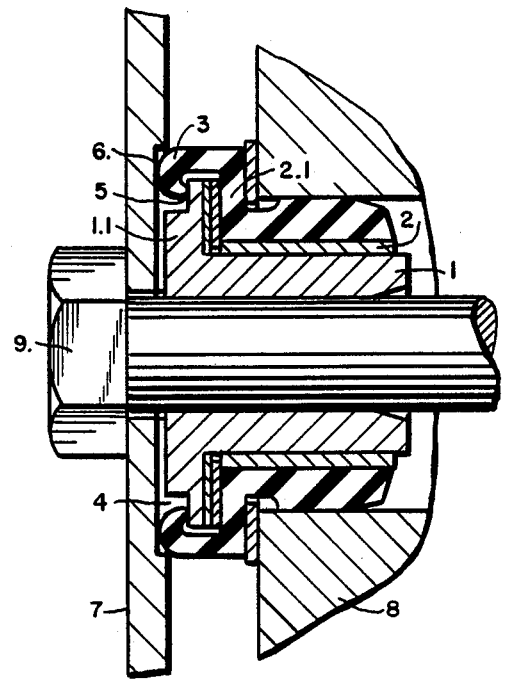

SLEEVE BEARING

BACKGROUND OF THE INVENTION

The present invention relates to a sleeve bearing comprised of two sleeves which are mounted for relative rotation one inside the other and contact one another at outwardly projecting radial flanges. The outer sleeve consists of rubber on the side of the profile facing away from the inner sleeve and contacts the flange of the inner sleeve with a circumferential sealing lip.

A sleeve bearing of this type is known in the art. It is used, for example, in mounting steering wheels of motor vehicles. However, the wear in this bearing is considerable and can result in an impairment of driving safety.

SUMMARY OF THE INVENTION

It is the principal object of the present invention to further develop a sleeve bearing of the type described above, so as to reduce wear at the surfaces which are in contact and hence to extend its useful life.

This object, as well as other objects which will become apparent from the discussion that follows, are achieved, in accordance with the present invention, in a sleeve bearing of this type, by providing that the sealing lip reaches externally around the profile of the projecting flange of the inner sleeve and, on the side facing axially away from the projecting flange of the outer sleeve, contacts it with a sealing edge under resilient bias.

In the sleeve bearing in accordance with the invention, the sealing lip of the flange of the outer sleeve reaches around outside of the flange of the inner sleeve, and has a sealing edge which contacts the flange of the inner sleeve under resilient bias. The surfaces of the sleeve bearing which are in frictional contact with one another are thus substantially better protected against contamination by foreign matter. This greatly increases the sleeve bearing's useful life.

The sealing edge can contact the flange within an angular recess, which makes it possible to reduce the axial length of the sleeve bearing and make it equal to the axial length of the known sleeve bearing. With such a sleeve bearing there is no need for redesign of the bearing mount, when a sleeve bearing of the prior art is to be replaced with the new sleeve bearing in accordance with the invention.

The sealing lip can reach beyond the projecting flange of the inner sleeve when the sleeve bearing is in the installed position and can have a sealing surface at its rim on the side opposite the sealing edge. When the bearing is properly installed, this sealing surface will be in sealing contact with the confronting surface of an adjacent machine part, such as a longitudinal member or reinforcing member of the motor vehicle, thus providing an additional seal ahead of the actual sealing edge. This substantially reduces the amount of dirt that can reach the inner sealing edge and considerably lengthens the useful life of the bearing.

The sealing edge and the sealing surface can have different diameters in such a bearing. It has proven to be desirable for the sealing lip to have the sealing surface on one side and the sealing edge on the other, and for its profile to curve back radially from this point both on the inside and on the outside. In spite of mutual support in the resilient pressing against the surfaces to be sealed, the result in this case is a substantial avoidance of relaxation phenomena; i.e., a highly unvarying pressure over long periods of time against the surfaces to be sealed.

The profile of the sealing edge and sealing surface producing the seal can be modified for adaptation to the profile of particular seals being used.

With a view toward ease of manufacture and toward an especially long useful life, it has been found to be especially desirable for the sealing lip to have an overall arcuate profile and thus to have a sealing edge and sealing surface each having a rounded profile.

A preferred embodiment of the sleeve bearing in accordance with the invention will now be described with reference to the accompanying drawing.

BRIEF DESCRIPTION OF THE DRAWING

The single FIGURE is an axial cross-sectional view of a preferred embodiment of a sleeve bearing according to the present invention.

DESCRIPTION OF THE PREFERRED EMBODIMENT

The sleeve bearing shown in the FIGURE serves to pivotally mount a steering arm 8 with respect to longitudinal members 7 of a motor vehicle. The bearing is fastened by means of a bolt 9 and consists essentially of two sleeves 1 and 2 which are mounted for relative rotation, one inside the other, and which are in contact with one another at radially projecting flanges 1.1 and 2.1. The outer sleeve 2 consists of rubber on its outer side, and has a circumferential sealing lip 3 which reaches externally around the flange 1.1 of the inner sleeve such that the rounded edge 5 of the sealing lip 3 makes sealing contact under resilient bias in a recess 4 of the outer end face of the flange 1.1 of the inner sleeve. The installed axial length of the sleeve bearing is thus largely the same as with known bearings.

The dimensions of the sealing lip 3 are such that, in the installed position, it extends axially slightly beyond the outer end face of flange 1.1 of the inner sleeve 1. The result is a sealing contact between the extreme outer end of the sealing lip 3 and the confronting face of the longitudinal member 7 of the motor vehicle. According to the present invention, this contact serves to provide a seal preceding the seal produced at edge 5. The confronting face of longitudinal member 7 is therefore treated as a sealing surface 6. Its Profile can be rounded to increase its resistance to contamination, and can be configured differently—with a sharp edge for example—to adapt to particular requirements of the application.

The sealing edge 5 and sealing surface 6 have different diameters in the embodiment illustrated. At the same time the sealing lip 3 is defined axially by the sealing edge 5 on the one hand and by the sealing surface 6 on the other. Starting from these surfaces its profile is turned back axially inwardly and radially outwardly. The sealing lip therefore has good flexibility in the axial direction, which enables it to provide good compensation over long periods of time for relative axial displacements of the steering arm 8, and hence of the outer sleeve 2 with respect to the longitudinal member 7, and to provide for sufficient contact pressure between sealing edge 5 and sealing surface 6 and their associated sealing surfaces. In addition, the sealing lip has an arcuately curved profile thus, largely preventing the formation of a tightly adhering layer of contamination.

There has thus been shown and described a novel sleeve bearing which fulfills all the objects and advantages sought therefor. Many changes, modifications, variations and other uses and applications of the subject invention will, however, become apparent to those skilled in the art after considering this specification and the accompanying drawing which disclose the preferred embodiment thereof. All such changes, modifications, variations and other uses and applications which do not depart from the spirit and scope of the invention are deemed to be covered by the invention which is limited only by the following claims.

What is claimed is:

1. In a sleeve bearing comprised of inner and outer sleeves, each having an outwardly projecting radial flange, being mounted for relative rotation with the inner sleeve inside the outer sleeve and contacting one another at said outwardly projecting flanges, the outer sleeve consisting of rubber on the side of the profile facing away from the inner sleeve and contacting the flange of the inner sleeve with a circumferential sealing lip; the improvement wherein the sealing lip of the outer sleeve reaches externally around the profile of the projecting flange of the inner sleeve and contacts the flange of the inner sleeve with a sealing edge under resilient bias on the side facing axially away from the projecting flange of the outer sleeve.

2. The sleeve bearing in accordance with claim 1, wherein the sealing edge contacts the projecting flange of the inner sleeve in an angular recess.

3. The sleeve bearing in accordance with claim 2, wherein the sealing lip reaches axially around the projecting flange of the inner sleeve in the ready-to-use state and wherein the surface of the sealing lip facing axially away from the sealing edge is configured as a circumferential sealing surface.

4. The sleeve bearing in accordance with claim 3, wherein the sealing edge and the sealing surface have different diameters.

5. The sleeve bearing in accordance with claim 4, wherein the sealing lip is contacted axially on one side at the sealing edge and on the other side at the sealing surface.

6. The sleeve bearing in accordance with claim 5, wherein the sealing lip has an arcuately curved profile.

* * * * *